United States Patent
Oh et al.

(10) Patent No.: US 11,270,586 B2
(45) Date of Patent: Mar. 8, 2022

(54) SYSTEM AND METHOD FOR PROVIDING INFORMATION REGARDING PARKING SPACE

(71) Applicants: Hyundai Motor Company, Seoul (KR); KIA Motors Corporation, Seoul (KR)

(72) Inventors: Se Min Oh, Incheon (KR); Hoo Young Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 193 days.

(21) Appl. No.: 16/530,176

(22) Filed: Aug. 2, 2019

(65) Prior Publication Data
US 2020/0175870 A1 Jun. 4, 2020

(30) Foreign Application Priority Data
Dec. 3, 2018 (KR) .................. 10-2018-0153946

(51) Int. Cl.
| G08G 1/14 | (2006.01) |
| G06K 9/00 | (2006.01) |
| G06K 9/46 | (2006.01) |
| G06F 3/14 | (2006.01) |

(52) U.S. Cl.
CPC .......... *G08G 1/143* (2013.01); *G06F 3/14* (2013.01); *G06K 9/00335* (2013.01); *G06K 9/00369* (2013.01); *G06K 9/00838* (2013.01); *G06K 9/46* (2013.01); *G08G 1/146* (2013.01); *G06K 2209/23* (2013.01)

(58) Field of Classification Search
CPC ........ G08G 1/143; G08G 1/146; G08G 1/144; G09G 2380/10; G09G 2340/12; G06K 9/00335; G06K 9/00369; G06K 2209/23; G06K 9/46; G06K 9/00838; G06K 9/00771; G06F 3/14

See application file for complete search history.

(56) References Cited

U.S. PATENT DOCUMENTS

| 2008/0051957 | A1* | 2/2008 | Breed | B60R 21/0152 701/36 |
| 2011/0320256 | A1* | 12/2011 | Florucci | G07F 17/246 705/14.33 |
| 2013/0147959 | A1* | 6/2013 | Wang | G06K 9/00362 348/149 |
| 2014/0139359 | A1* | 5/2014 | Paul | G08G 1/141 340/932.2 |
| 2020/0193824 | A1 | 6/2020 | Lee et al. | |

FOREIGN PATENT DOCUMENTS

| KR | 20160073153 A | * | 6/2016 |
| KR | 10-2020-0072017 A | | 6/2020 |

* cited by examiner

*Primary Examiner* — Pinalben Patel
(74) *Attorney, Agent, or Firm* — McDonnell Boehnen Hulbert & Berghoff LLP (57) ABSTRACT

The present disclosure relates to a system and method for providing information regarding a parking space. The system includes a terminal located in a vehicle desired to be parked and a server that obtains occupant information and vehicle information of vehicles parked in parking spaces through cameras installed in a parking lot, predicts departure time of the parked vehicles based on the occupant information and the vehicle information, and provides parking space information based on the predicted departure time to the terminal.

20 Claims, 6 Drawing Sheets

SYSTEM AND METHOD FOR PROVIDING INFORMATION REGARDING PARKING SPACE

CROSS-REFERENCE TO RELATED APPLICATION

This application is claims the benefit of priority to Korean Patent Application No. 10-2018-0153946, filed in the Korean Intellectual Property Office on Dec. 3, 2018, the entire contents of which are incorporated herein by reference.

TECHNICAL FIELD

The present disclosure relates to a system and method for providing information regarding a parking space in a parking lot.

BACKGROUND

A parking lot in a densely populated area is crowded with a number of vehicles exceeding its capacity, and it takes a lot of time to park vehicles in the parking lot. To solve this problem, services for informing of the number of vehicles that can be parked in the parking lot and the degree of congestion are provided.

However, in the case where there is a vehicle parked in a parking space desired by a driver, or the parking lot is full, the driver has to spend time waiting for the corresponding parked vehicle to be pulled out because the driver cannot know when the parked vehicle is pulled out.

SUMMARY

The present disclosure has been made to solve the above-mentioned problems occurring in the prior art while advantages achieved by the prior art are maintained intact.

An aspect of the present disclosure provides a system and method for providing parking space information to a vehicle desired to be parked, by analyzing occupant information and vehicle information of vehicles parked in a parking lot and predicting departure time of the parked vehicles.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for providing information regarding a parking space includes a terminal located in a vehicle desired to be parked and a server that obtains occupant information and vehicle information of vehicles parked in parking spaces through cameras installed in a parking lot, predicts departure time of the parked vehicles based on the occupant information and the vehicle information, and provides parking space information based on the predicted departure time to the terminal.

The server may include a detector that detects images of the parked vehicles through the cameras, a communication device that performs wireless communication with the terminal, storage that brings visit history information of the parked vehicles into a database and manages the database, and a processor that extracts the occupant information and the vehicle information by analyzing the images, calculates expected departure time of the parked vehicles, based on the extracted occupant information and the extracted vehicle information, and instructs the communication device to transmit the calculated expected departure time to the terminal.

The occupant information may include the number of occupants in each of the parked vehicles, information regarding the occupants getting in or out of the parked vehicle, information regarding genders of the occupants, information regarding ages of the occupants, and information regarding a relationship between the occupants.

The vehicle information may include a vehicle number of each of the parked vehicles, a model of the parked vehicle, and the number of times that doors and a tail gate of the parked vehicle are opened.

The processor may extract the occupant information and the vehicle information from the images by using a deep learning algorithm.

The processor may identify the number of occupants getting in or out of each of the parked vehicles and may determine whether the parked vehicle is to be pulled out.

The terminal may display parking spaces from which parked vehicles are likely to be pulled out within predetermined time, based on the parking space information received from the server.

The terminal may select one parking space from the parking spaces from which the parked vehicles are likely to be pulled out within the predetermined time and may request preemption of the selected parking space from the server.

The processor may place the desired vehicle on a waiting list for parking in the selected parking space and may assign a waiting number to the terminal when there is a vehicle parked in the corresponding parking space.

According to another aspect of the present disclosure, a terminal includes a communication device that performs wireless communication with a parking lot server, a display that displays parking space information received from the parking lot server, and a processor that selects one parking space desired for parking based on the parking space information, requests preemption of the selected parking space from the parking lot server, and guides parking in the selected parking space.

According to another aspect of the present disclosure, a method for providing information regarding a parking space includes obtaining images of vehicles parked in parking spaces, by a server, extracting occupant information and vehicle information of the parked vehicles from the obtained images by the server, predicting departure time of the parked vehicles by the server, based on the extracted occupant information and the extracted vehicle information, and providing parking space information based on the predicted departure time to a vehicle desired to be parked, by the server.

The extracting of the occupant information and the vehicle information may include extracting the occupant information and the vehicle information from the obtained images by using at least one of an image signal processing algorithm and a deep learning algorithm.

The occupant information may include the number of occupants in each of the parked vehicles, information regarding the occupants getting in or out of the parked vehicle, information regarding genders of the occupants, information regarding ages of the occupants, and information regarding a relationship between the occupants.

The vehicle information may include a vehicle number of each of the parked vehicles, a model of the parked vehicle, and the number of times that doors and a tail gate of the parked vehicle are opened.

The predicting of the departure time of the parked vehicles may include assigning weighting values to items of the occupant information and the vehicle information by the server, calculating expected departure time of the parked vehicles by the server in view of the information to which the weighting values are assigned, and determining an expected departure sequence of the parked vehicles by the server, based on the calculated expected departure time.

The predicting of the departure time of the parked vehicles may include calculating expected departure time of the parked vehicles by the server in view of previous parking histories of the parked vehicles.

The providing of the parking space information to the vehicle desired to be parked may include transmitting expected departure time and an expected departure sequence of the parked vehicles to a terminal located in the vehicle desired to be parked, by the server.

The method may further include selecting one parking space by the terminal, based on the parking space information after the providing of the parking space information to the vehicle desired to be parked, requesting preemption of the selected parking space from the server by the terminal, processing the preemption of the selected parking space by the server in response to the request of the terminal, and transmitting an outcome of processing the preemption of the selected parking space to the terminal by the server.

The method may further include informing the terminal that the selected parking space is available, by the server when a vehicle parked in the selected parking space is pulled out, after the transmitting of the outcome.

The terminal may display the parking space information in different colors according to probabilities of parking in the respective parking spaces.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
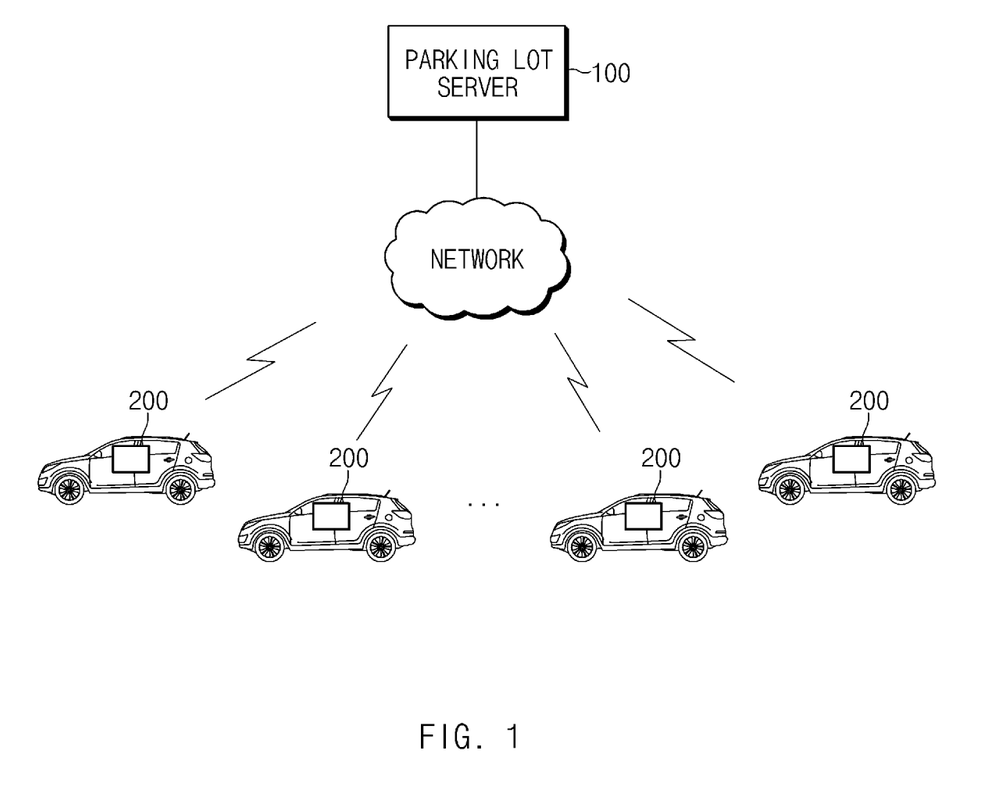
FIG. 1 is a schematic view illustrating a configuration of a system for providing information regarding a parking space according to an embodiment of the present disclosure.
Figure 2:
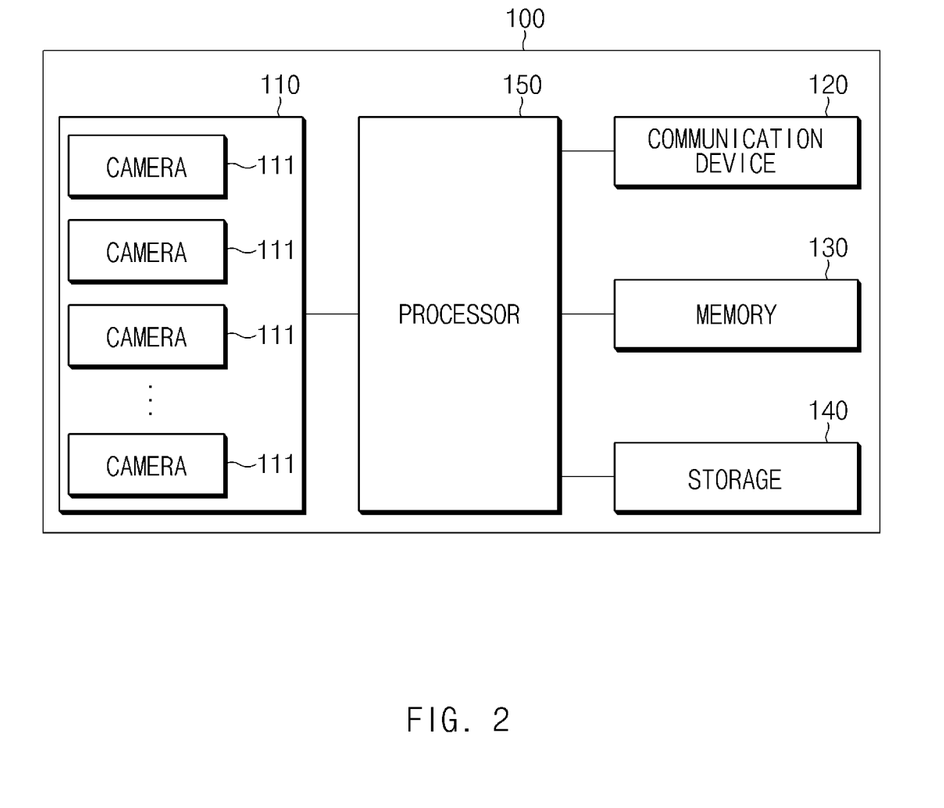
FIG. 2 is a block diagram illustrating the parking lot server illustrated in FIG. 1.
Figure 3:
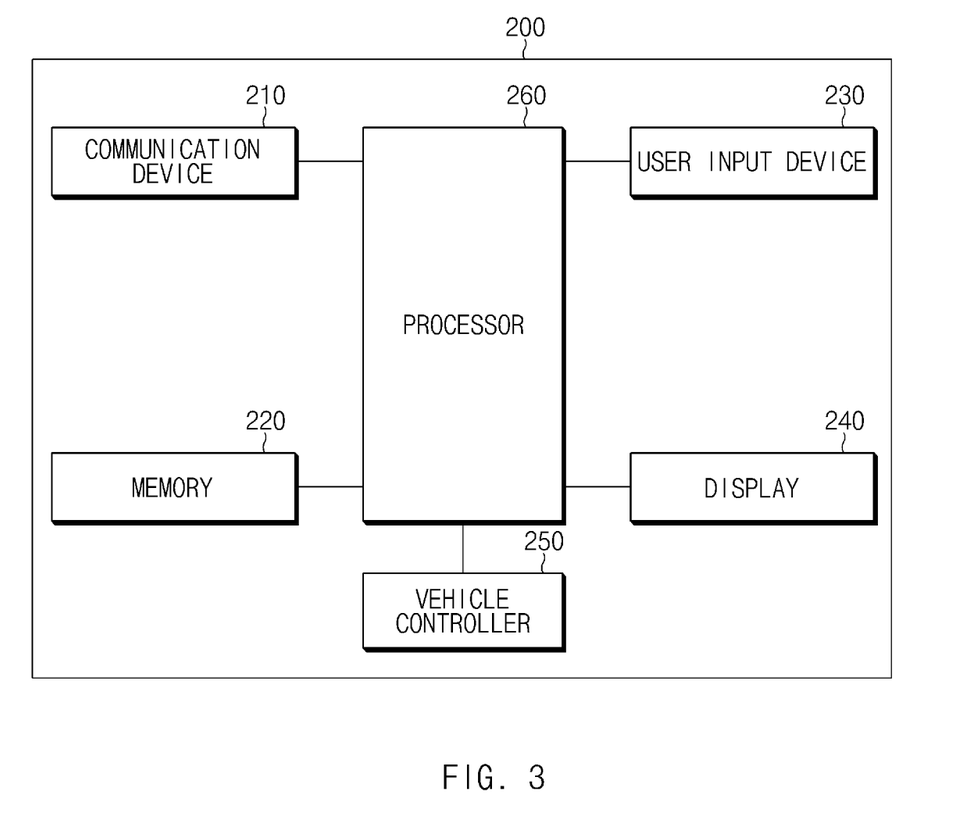
FIG. 3 is a block diagram illustrating the terminal illustrated in FIG. 1.

FIG. 1 is a schematic view illustrating a configuration of a system for providing information regarding a parking space according to an embodiment of the present disclosure. FIG. 2 is a block diagram illustrating the parking lot server 100 illustrated in FIG. 1, and FIG. 3 is a block diagram illustrating the terminal 200 illustrated in FIG. 1.

Referring to FIG. 1, the system for providing information regarding a parking space includes the parking lot server (hereinafter, referred to as the server) 100 and the terminal 200 that are connected together via a network. Here, the network may be implemented by a wireless internet technology such as wireless LAN (WLAN) (e.g., Wi-Fi), wireless broadband (Wibro), and/or world interoperability for microwave access (Wimax), a short range communication technology such as Bluetooth, near field communication (NFC), and/or radio frequency identification (RFID), a mobile communication technology such as code division multiple access (CDMA), global system for mobile communication (GSM), long term evolution (LTE), and/or LTE-advanced, and/or a vehicle to everything (V2X) communication technology such as vehicle to infra (V2I).

The server 100 may be installed inside or outside a parking lot. The server 100 manages a vehicle entering the parking lot, a vehicle leaving the parking lot and/or a parking space, vehicles parked in parking spaces (parked vehicles), a vehicle desired to be parked, and a vehicle that is waiting to park in a specific parking space. The server 100 brings information regarding the visit history of each vehicle to the parking lot into a database (DB) and manages the database. Here, the visit history information may include the visit date, the arrival time, the departure time, information regarding the occupants, information regarding the vehicle, and the parking time (the duration of stay). The occupant information may include the number of occupants in the vehicle, information regarding the occupants who get in or out of the vehicle, information regarding the genders of the occupants, information regarding the ages of the occupants, and information regarding the relationship between the occupants. The vehicle information may include the vehicle number, the vehicle model, the number of times that the doors and the tail gate are opened, and the time during which the doors and the tail gate are open.

The server 100 calculates expected departure time of the parked vehicles, based on occupant information and vehicle information of the corresponding parked vehicles. The server 100 determines an expected departure sequence of the parked vehicles, based on the calculated expected departure time. The server 100 provides information regarding parking spaces with a high possibility (probability) of parking within a preset time period and/or radius, to a driver waiting to park (a vehicle desired to be parked), based on the expected departure time and the expected departure sequence of the vehicles parked in the parking lot.

The server 100 assigns a waiting number to the driver, who is waiting to park, in response to a request of the driver to allow the driver to preempt a parking space desired for parking. In the case where there is a vehicle parked in the parking space that the driver desires to park in, the server 100 places the vehicle of the driver, who is waiting to park, on a waiting list for parking in the corresponding parking space and assigns the waiting number. When the vehicle parked in the parking space that the driver desires to park in is pulled out, the server 100 informs the driver that the corresponding parking space is available, according to the waiting number thereof.

The terminal 200 is located in the vehicle desired to be parked and is capable of wireless and/or wired communication. The terminal 200 may be implemented with a communication device, such as a smartphone, a tablet PC, a personal digital assistant (PDA), a portable multimedia player (PMP), a notebook computer, an infotainment system, a navigation terminal, and/or an audio video navigation (AVN). The terminal 200 may be operated by a user (e.g., the driver) in the vehicle desired to be parked.

The terminal 200 receives the parking space information from the server 100 and displays the parking space information on a display screen. The terminal 200 selects one parking space from the parking spaces in response to an input of the user (the driver who is waiting to park). The terminal 200 requests preemption of the selected parking space from the server 100. The terminal 200 may receive an outcome of processing the preemption of the selected parking space by the server 100 and may display the outcome on the display screen. For example, in the case where there is a vehicle parked in the parking space selected by the user, the terminal 200 receives a waiting number assigned by the server 100 and displays the waiting number on the display screen.

Hereinafter, configurations of the server 100 and the terminal 200 will be described in detail with reference to FIGS. 2 and 3.

Referring to FIG. 2, the server 100 includes a detector 110, a communication device 120, a memory 130, storage 140, and a processor 150.

The detector 110 detects images of vehicles that visit the parking lot, through a plurality of cameras 111. One or more cameras 111 are installed at different positions in the parking lot. For example, the one or more cameras 111 are installed at the entrance and the exit of the parking lot and in parking spaces of the parking lot. The cameras 111 may be implemented with at least one image sensor among image sensors such as a charge coupled device (CCD) image sensor, a complementary metal oxide semiconductor (CMOS) image sensor, a charge priming device (CPD) image sensor, and a charge injection device (CID) image sensor. The cameras 111 may be equipped with at least one lens among lenses such as a traditional lens, an extreme wide angle lens, a wide angle lens, a zoom lens, a macro lens, a telephoto lens, a fisheye lens, and a quasi-fisheye lens. Furthermore, the cameras 111 may include an image processor that performs image processing, such as noise removal, color reproduction, file compression, image quality adjustment, and color saturation adjustment, on images obtained through the at least one image sensor.

The detector 110 obtains facial images of occupants who move to the parking lot to get in vehicles, through cameras (e.g., CCTV) installed in the commercial facility (e.g., a department store, a shopping mall, or a mart) where the parking lot is located.

The communication device 120 performs wireless communication with the terminal 200. The wireless communication may be implemented by at least one of communication technologies such as wireless internet (e.g., Wi-Fi), short range communication (e.g., Bluetooth, ZigBee, and infrared communication), mobile communication, and vehicle communication (e.g., V2I).

The memory 130 may store a program for an operation of the processor 150 and may temporarily store input/output data. The memory 130 may store an image signal processing algorithm and a deep learning algorithm. The memory 130 may store images obtained by the cameras 111 and information (data) received via the communication device 120. The memory 130 may store parking map data.

The memory 130 may be implemented with at least storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), and a register.

The storage 140 stores and manages information regarding the visit history of each vehicle to the parking lot in the form of a database (DB). The storage 140 may be implemented with at least one storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), and a register.

The processor 150 controls an overall operation of the server 100. The processor 150 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

When vehicles enter the parking lot through the entrance thereof, the processor 150 detects (obtains) images of the entering vehicles through the detector 110. The processor 150 extracts occupant information and vehicle information from the detected images. The processor 150 may extract the occupant information and the vehicle information from images taken with the cameras 111, by using an image signal processing technology and a deep learning technology that are well known in the art.

The processor 150 assigns weighting values to items of the extracted occupant information and the extracted vehicle information. For example, the processor 150 assigns a higher weighting value when the gender of an occupant is female than when the gender of an occupant is male, and assigns a higher weighting value in ascending order of age, that is, in the order of child, youth, middle age, and old age. Furthermore, the processor 150 assigns a higher weighting value with an increase in the number of occupants. The processor 150 assigns a higher weighting value in the order of a compact vehicle, a sedan, and a sports utility vehicle (SUV), assigns a higher weighting value with an increase in the number of times that vehicle doors and a tail gate are opened, and assigns a higher weighting value with an increase in the number of times that occupants get in or out of a vehicle.

When the entering vehicles are parked in specific parking spaces in the parking lot, the processor 150 calculates expected departure time and an expected departure sequence of the parked vehicles. The processor 150 obtains images of the parked vehicles through the cameras 111 and extracts information regarding occupants getting in or out of each parked vehicle and information regarding opening of the vehicle doors and the tail gate, from the obtained images.

The processor 150 estimates the expected departure time and the expected departure sequence, based on the occupant information and the vehicle information of the parked vehicles. The processor 150 checks visit history information stored in the storage 140, by using the vehicle numbers of the parked vehicles, identifies the parking time (the duration of stay) of the parked vehicles during the previous visit, and predicts (estimates) the expected departure time in view of the identified parking time during the previous visit. The processor 150 determines the expected departure sequence of the parked vehicles, based on the estimated expected departure time. In this embodiment, it is exemplified that the processor 150 estimates the expected departure time in view of the parking time during the previous visit. However, without being limited thereto, the processor 150 may be implemented to estimate the expected departure time in view of the parking time during the previous visit, the occupant information, and the vehicle information.

Furthermore, the processor 150 may predict departure time of each parked vehicle through big data analysis based on the number of occupants and information regarding the relationship between the occupants. For example, the processor 150 may analyze the duration of parking, depending on whether there are many occupants, or few occupants, in the parked vehicle and whether the occupants belong to one family or are husband and wife, and may estimate departure time of the parked vehicle by utilizing the analysis result. In the case where all the occupants get out of the parked vehicle except some of them, the processor 150 may determine that the occupants who get out of the parked vehicle are more likely to get in the parked vehicle within a short time, and in view of that, the processor 150 may estimate departure time of the parked vehicle.

The processor 150 transmits parking space information including the calculated expected departure time and the calculated expected departure sequence of the parked vehicles to the terminal 200 via the communication device 120. Thereafter, the processor 150 receives a request for preemption of a parking space from the terminal 200 via the communication device 120 and processes the preemption of the corresponding parking space. In the case where there is at least one other terminal that requests preemption of the parking space before the terminal 200, the processor 150 places the terminal 200 on a waiting list for parking in the corresponding parking space and assigns a waiting number to the terminal 200.

When the vehicle parked in the parking space is pulled out, the processor 150 transmits notification that the parking space is available, to the terminal 200 in the vehicle that is waiting to park in the parking space. The processor 150 transmits the notification to the terminal 200 that has its turn according to the waiting number.

The processor 150 determines whether the parked vehicle is to be pulled out, by using information regarding occupants who get in or out of the parked vehicle and transmits the determination result to the terminal 200 located in the vehicle that is waiting to park. The processor 150 compares the number of occupants who get out of the parked vehicle and the number of occupants who get in the parked vehicle, through the cameras 111 and determines that the parked vehicle is to be pulled out, when the number of occupants who get out of the parked vehicle is the same as the number of occupants who get in the parked vehicle. Furthermore, the processor 150 may determine whether the parked vehicle is to be pulled out, by analyzing facial images obtained through the detector 110 and identifying occupants who are moving to the parking lot to get in the parked vehicle and the number of occupants. For example, when it is determined that three occupants who got out of the parked vehicle are moving to the parking lot, the processor 150 determines that the corresponding parked vehicle is to be pulled out.

In this embodiment, it is exemplified that the parking lot server 100 identifies the number of occupants who are moving to the parking lot to get in the parked vehicle, through the CCTV installed in the commercial facility. However, a commercial facility system may identify the number of occupants who are moving to the parking lot to get in the parked vehicle and may provide the number of occupants to the server 100.

Referring to FIG. 3, the terminal 200 includes a communication device 210, a memory 220, a user input device 230, a display 240, a vehicle controller 250, and a processor 260.

The communication device 210 performs wireless communication with the server 100. The wireless communication may be implemented by at least one of communication technologies such as wireless internet (e.g., Wi-Fi), short range communication (e.g., Bluetooth, ZigBee, and infrared communication), mobile communication, and vehicle communication (e.g., V2I).

The communication device 210 may support in-vehicle communication. A controller area network (CAN), a media oriented systems transport (MOST) network, a local interconnect network (LIN), and/or an x-by-wire (Flexray) may be used as the in-vehicle communication.

The memory 220 stores software programmed to cause the processor 260 to perform a predetermined operation. The memory 220 may temporarily store input and/or output data of the processor 260. The memory 220 may store the expected departure time and the expected departure sequence of the parked vehicles that are received via the communication device 210. The memory 220 may store map data and parking map data. The parking map data may be received from the server 100.

The memory 220 may be implemented with at least storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), and a register.

The user input device 230 generates data according to an operation of a user (e.g., the driver and an occupant). The user input device 230 may be implemented with a keyboard, a keypad, a button, a switch, a touch pad, and/or a touch screen.

The display 240 outputs states and outcomes according to operations of the processor 260 as visual information. For example, the display 240 displays, on the parking map, a parking status, expected departure time for each parked vehicle, an expected departure sequence, the number of vehicles waiting to park, and waiting time.

The display 240 may include one or more of a liquid crystal display (LCD), a thin film transistor-liquid crystal display (TFT LCD), an organic light-emitting diode (OLED)

display, a flexible display, a three-dimensional (3D) display, a transparent display, a head-up display (HUD), a touch screen, and a cluster.

The display 240 may include a sound output module, such as a speaker, which is capable of outputting audio data. For example, the display 240 may display directions information and may output a sound signal (an audio signal) through the speaker.

Furthermore, the display 240 may be implemented with a touch screen combined with a touch sensor and may be used as an input device as well as an output device. A touch film or a touch pad may be used as the touch sensor.

The vehicle controller 250 supports autonomous driving and autonomous parking of the vehicle. The vehicle controller 250 parks the vehicle in a parking space set as a destination according to an instruction of the processor 260. The vehicle controller 250 may be implemented by applying various well-known autonomous driving systems and autonomous parking systems. Therefore, a specific description thereabout will be omitted.

When receiving the expected departure time and the expected departure sequence of the parked vehicles via the communication device 210, the processor 260 displays expected departure information (including the expected departure time and the expected departure sequence) of the parked vehicles on the display 240, based on the received information.

The processor 260 displays expected departure information of parked vehicles that have a high probability of departure and pertain to a predetermined upper range (e.g., the top 30%). The processor 260 displays different colors according to possibilities of departure (probabilities of departure) to improve the visibility of the driver who is waiting to park.

Figure 4:
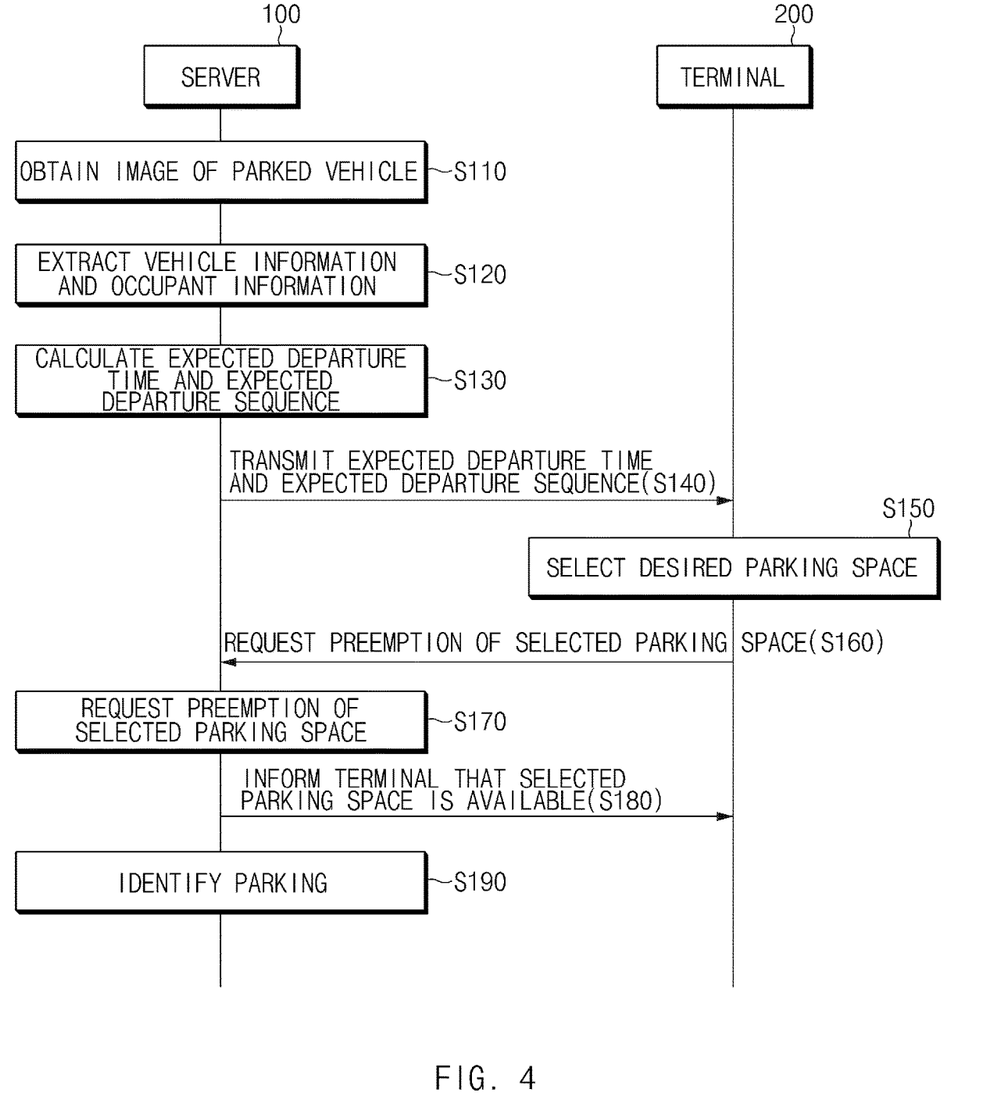
FIG. 4 is a flowchart illustrating a method for providing information regarding a parking space according to an embodiment of the present disclosure.

FIG. 4 is a flowchart illustrating a method for providing information regarding a parking space according to an embodiment of the present disclosure.

The server 100 obtains images of vehicles parked in the parking lot, through the cameras 111 (S110). The processor 150 of the server 100 obtains images of the vehicles entering the parking lot, through the cameras 111 and extract occupant information and vehicle information from the obtained images. The processor 150 monitors movement of the entering vehicles through the images obtained by the cameras 111. When each of the entering vehicles is parked in a parking space in the parking lot, the processor 150 obtains images of the parked vehicles through the cameras 111.

The server 100 extracts occupant information and vehicle information of the parked vehicles from the obtained images (S120). The processor 150 of the server 100 extracts the occupant information and the vehicle information from the obtained images by using an image signal processing algorithm and a deep learning algorithm.

The server 100 calculates expected departure information (expected departure time and an expected departure sequence) of the parked vehicles, based on the extracted occupant information and the extracted vehicle information (S130). The processor 150 of the server 100 estimates the expected departure time and the expected departure sequence of the parked vehicles in view of the visit history information of the parked vehicles that is stored in the storage 140, in addition to the extracted occupant information and the extracted vehicle information. Furthermore, the processor 150 calculates the expected departure information of the parked vehicles in view of weighting values assigned to items of the occupant information and the vehicle information.

The server 100 transmits the expected departure information of the parked vehicles to the terminal 200 (S140). The processor 150 of the server 100 transmits the expected departure information via the communication device 120.

The terminal 200 selects a desired parking space, based on the received expected departure information (S150). Based on the expected departure information, the processor 260 of the terminal 200 displays expected departure information of parked vehicles with a possibility of departure within a preset range, among the parked vehicles, on the display 240. The processor 260 displays expected departure time of the parked vehicles and the number of vehicles waiting to park. The processor 260 selects one parking space from the parking spaces in response to a user input entered through the user input device 230.

The terminal 200 requests preemption of the selected parking space from the server 100 (S160). The processor 260 of the terminal 200 transmits position information of the selected parking space to the server 100.

The server 100 processes the preemption of the selected parking space in response to the request of the terminal 200 (S170). In the case where another vehicle waiting to park also requests preemption of the selected parking space, the processor 150 of the server 100 assigns waiting numbers according to the priorities of the vehicles that request the preemption and transmits the waiting numbers to the terminal 200. When the vehicle parked in the parking space requested to be preempted is pulled out, the processor 150 updates the assigned numbers and transmits the updated numbers to the terminal 200. The terminal 200 displays, in real time, the waiting number of the vehicle in which the terminal 200 is mounted.

When the parking space is available by processing the preemption of the parking space, the server 100 transmits notification for informing of the fact, to the terminal 200 (S180). When there is a vehicle parked in the selected parking space, the server 100 compares the number of occupants who get out of the corresponding parked vehicle and the number of occupants who get in the corresponding parked vehicle and informs the terminal 200 that the parked vehicle is to be pulled out, when the number of occupants who get out of the parked vehicle is the same as the number of occupants who get in the parked vehicle.

Thereafter, the server 100 determines whether the vehicle having the terminal 200 mounted therein is parked in the parking space (S190). When it is determined that the corresponding vehicle is parked in the parking space, the server 100 returns to S110 to obtain an image of the parked vehicle and extract occupant information and vehicle information of the vehicle.

Figure 5:
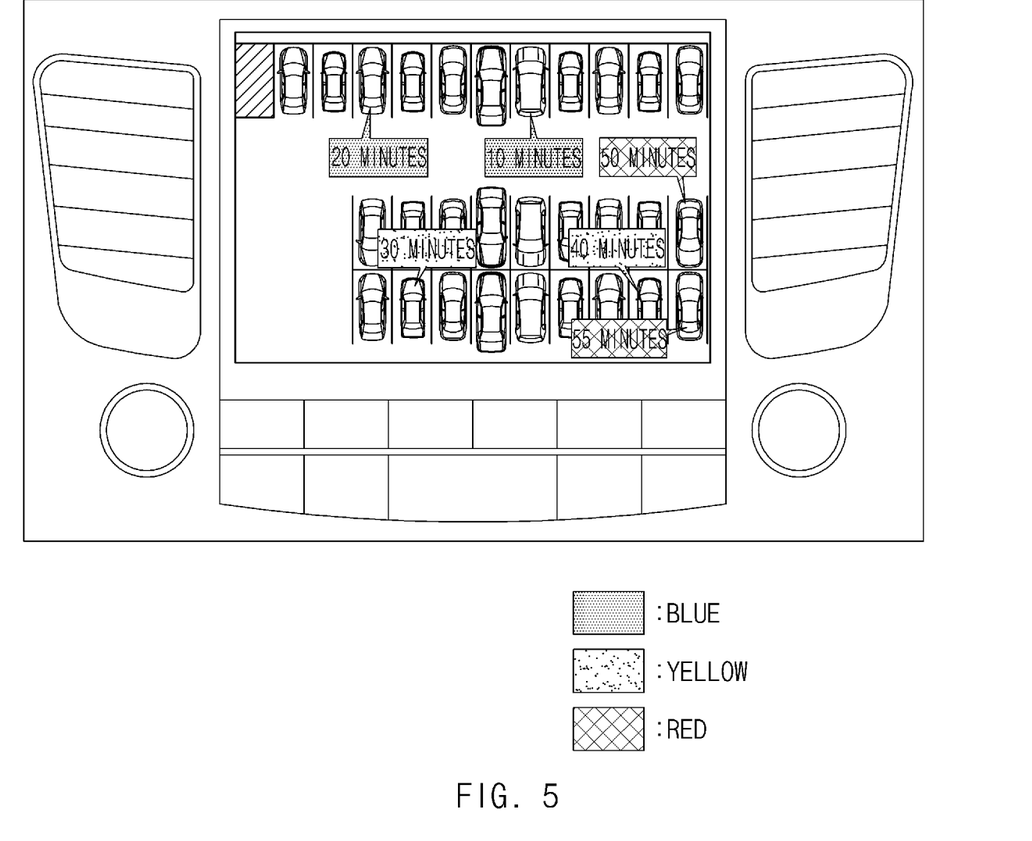
FIG. 5 is a graphical illustration of example expected departure information according to an embodiment of the present disclosure.
Figure 6:
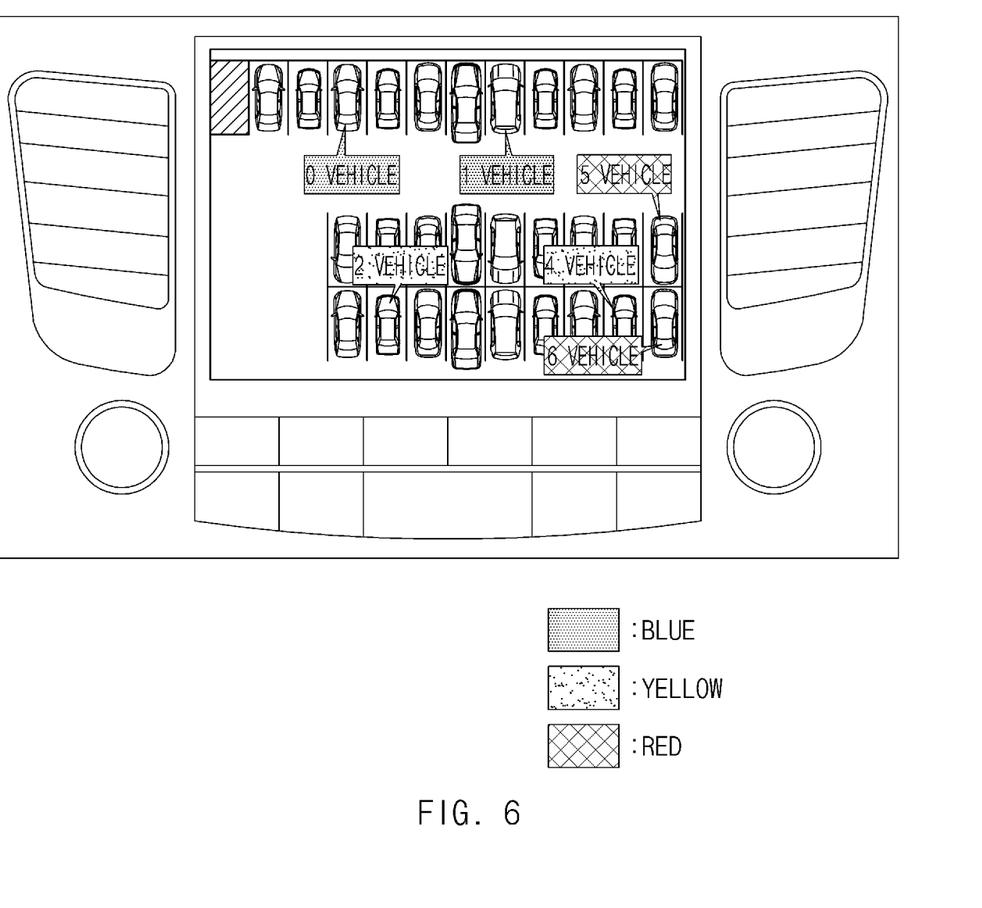
FIG. 6 is another graphical illustration of example expected departure information according to an embodiment of the present disclosure.

FIGS. 5 and 6 are views illustrating examples of displaying expected departure information according to an embodiment of the present disclosure.

The terminal 200 may display different colors according to probabilities (possibilities) of departure.

Referring to FIG. 5, the terminal 200 may extract parking spaces from which parked vehicles will be pulled out within 60 minutes, from the parking spaces in the parking lot and may display different colors according to probabilities that the vehicles parked in the extracted parking spaces will be pulled out. In other words, the terminal 200 displays expected departure time of the vehicles parked in the extracted parking spaces, in which the terminal 200 displays expected departure time of less than 20 minutes in blue, expected departure time of more than 20 minutes and less than 40 minutes in yellow, and expected departure time of more than 40 minutes and less than 60 minutes in red.

Referring to FIG. 6, the terminal 200 may extract parking spaces that 10 or fewer vehicles are waiting to park in, from the parking spaces in the parking lot and may display different colors according to probabilities that vehicles parked in the extracted parking spaces will be pulled out. The terminal 200 displays the number of vehicles waiting to park in blue when the number is smaller than or equal to 1, in yellow when the number ranges from 2 to 4, and in red when the number ranges 5 to 10.

According to the embodiments of the present disclosure, the system and method analyze the occupant information and the vehicle information of the vehicles parked in the parking lot, predict the departure time of the parked vehicles, and provide the parking space information to the vehicle desired to be parked, thereby saving time taken to find a vacant parking space.

In addition, according to the embodiments of the present disclosure, the system and method provide the expected departure time and the expected departure sequence of the parked vehicles, thereby enabling the driver to park in a desired parking space.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A system for providing information regarding a parking space, the system comprising:
   a terminal located in a vehicle desired to be parked; and
   a server configured to:
      obtain occupant information and vehicle information of vehicles parked in parking spaces through cameras installed in a parking lot, wherein the occupant information includes a number of occupants in each of the parked vehicles and information regarding a relationship between the occupants,
      check visit history information stored in a storage by using a vehicle number of each of the parked vehicles included in the vehicle information,
      predict departure time of the parked vehicles in view of parking time during a previous visit included in the visit history information,
      predict departure time of the parked vehicles through big data analysis based on the number of occupants in each of the parked vehicles and the information regarding a relationship between the occupants included in the occupant information, and
      provide parking space information based on the predicted departure time to the terminal.

2. The system of claim 1, wherein the server includes:
   a detector configured to detect images of the parked vehicles through the cameras;
   a communication device configured to perform wireless communication with the terminal;
   the storage configured to bring the visit history information of the parked vehicles into a database and manage the database; and
   a processor configured to:
      extract the occupant information and the vehicle information by analyzing the images,
      calculate expected departure time of the parked vehicles, based on the extracted occupant information and the extracted vehicle information, and
      instruct the communication device to transmit the calculated expected departure time to the terminal.

3. The system of claim 2, wherein the occupant information includes information regarding the occupants getting in or out of the parked vehicle, information regarding genders of the occupants, and information regarding ages of the occupants.

4. The system of claim 2, wherein the vehicle information includes a model of the parked vehicle, and a number of times that doors and a tail gate of the parked vehicle are opened.

5. The system of claim 2, wherein the processor extracts the occupant information and the vehicle information from the images by using a deep learning algorithm.

6. The system of claim 2, wherein the processor identifies a number of occupants getting in or out of each of the parked vehicles and determines whether the parked vehicle is to be pulled out.

7. The system of claim 2, wherein the terminal displays parking spaces from which parked vehicles are likely to be pulled out within predetermined time, based on the parking space information received from the server.

8. The system of claim 7, wherein the terminal selects one parking space from the parking spaces from which the parked vehicles are likely to be pulled out within the predetermined time, and requests preemption of the selected parking space from the server.

9. The system of claim 8, wherein the processor places the desired vehicle on a waiting list for parking in the selected parking space and assigns a waiting number to the terminal when there is a vehicle parked in a corresponding parking space.

10. A terminal comprising:
   a communication device configured to perform wireless communication with a parking lot server;
   a display configured to display parking space information received from the parking lot server; and
   a processor configured to select one parking space desired for parking based on the parking space information, request preemption of the selected parking space from the parking lot server, and guide parking in the selected parking space,
   wherein the parking lot server is configured to:
      check visit history information stored in a storage by using a vehicle number of each of parked vehicles included in vehicle information,
      predict departure time of the parked vehicles in view of parking time during a previous visit included in the visit history information, and
      predict departure time of the parked vehicles through big data analysis based on the number of occupants in each of the parked vehicles and the information regarding a relationship between the occupants included in the occupant information, and
   wherein the parking space information includes the predicted departure time of parked vehicles that is based on the occupant information and the vehicle information of the parked vehicles that are obtained through cameras by the parking lot server.

11. A method for providing information regarding a parking space, the method comprising:
 obtaining, by a server, images of vehicles parked in parking spaces;
 extracting, by the server, occupant information and vehicle information of the parked vehicles from the obtained images, wherein the occupant information includes a number of occupants in each of the parked vehicles and information regarding a relationship between the occupants;
 checking, by a server, visit history information stored in a storage by using a vehicle number of each of parked vehicles included in vehicle information;
 predicting, by a server, departure time of the parked vehicles in view of parking time during a previous visit included in the visit history information;
 predicting, by the server, departure time of the parked vehicles through big data analysis, based on the number of occupants in each of the parked vehicles and the information regarding a relationship between the occupants included in the extracted occupant information; and
 providing, by the server, parking space information based on the predicted departure time to a vehicle desired to be parked.

12. The method of claim 11, wherein the extracting of the occupant information and the vehicle information includes:
 extracting the occupant information and the vehicle information from the obtained images by using at least one of an image signal processing algorithm and a deep learning algorithm.

13. The method of claim 12, wherein the occupant information includes information regarding the occupants getting in or out of the parked vehicle, information regarding genders of the occupants, and information regarding ages of the occupants.

14. The method of claim 12, wherein the vehicle information includes a model of the parked vehicle, and a number of times that doors and a tail gate of the parked vehicle are opened.

15. The method of claim 11, wherein the predicting of the departure time of the parked vehicles includes:
 assigning, by the server, weighting values to items of the occupant information and the vehicle information;
 calculating, by the server, expected departure time of the parked vehicles in view of the information to which the weighting values are assigned; and
 determining, by the server, an expected departure sequence of the parked vehicles, based on the calculated expected departure time.

16. The method of claim 11, wherein the predicting of the departure time of the parked vehicles includes:
 calculating, by the server, expected departure time of the parked vehicles in view of previous parking histories of the parked vehicles.

17. The method of claim 11, wherein the providing of the parking space information to the vehicle desired to be parked includes:
 transmitting, by the server, expected departure time and an expected departure sequence of the parked vehicles to a terminal located in the vehicle desired to be parked.

18. The method of claim 17, further comprising:
 selecting, by the terminal, one parking space, based on the parking space information after the providing of the parking space information to the vehicle desired to be parked;
 requesting, by the terminal, preemption of a selected parking space from the server;
 processing, by the server, the preemption of the selected parking space in response to the request of the terminal; and
 transmitting, by the server, an outcome of processing the preemption of the selected parking space to the terminal.

19. The method of claim 18, further comprising:
 informing, by the server, the terminal that the selected parking space is available when a vehicle parked in the selected parking space is pulled out, after the transmitting of the outcome.

20. The method of claim 18, wherein the terminal displays the parking space information in different colors according to probabilities of parking in the respective parking spaces.

* * * * *